Patented June 26, 1945

2,379,251

UNITED STATES PATENT OFFICE 2,379,251

COMPOSITION OF MATTER

Irving E. Muskat and Franklin Strain, Akron, Ohio, assignors to Pittsburgh Plate Glass Company, Pittsburgh Pa., a corporation of Pennsylvania No Drawing. Application July 23, 1941,
Serial No. 403,703

1 Claim. (Cl. 260—484)

This invention relates to a new class of unsaturated esters having unusual properties which render them highly useful in various organic chemical arts.

Because of the complex nature of these new esters it is usually difficult and frequently impossible to name them by conventional systems of nomenclature. The compounds are accordingly named as esters of their constituent acid and hydroxy components. This is not intended to be a limitation to the compound made by the direct esterification as obviously the same ester can be made by several other conventional methods.

Common chemical nomenclature and terminology has been used when possible. Frequently, however, chemical expressions may have several accepted meanings. It is therefore necessary to define the scope of these ambiguous expressions which must necessarily be used to describe the invention.

The expression "poly-acidic" compound has been used herein in the generic sense to include all compounds having two or more acid groups (i. e., acidic OH or —COOH) and which do not contain a free alcohol type of hydroxyl group. The expression is intended to include polybasic inorganic acids such as boric, silicic, carbonic, sulphuric, or phosphoric acids, the polycarboxylic acids such as oxalic, succinic, adipic, maleic, fumaric, tricarballylic, phthalic, diphenyl dicarboxylic or naphthalic acids, the heterocyclic acids such as quinolinic, cinchomeronic, ethylene oxide αα dicarboxylic or cotarinic acids, or the ether acids such as diglycolic, dilactic, the corresponding thio ether acids or methoxy succinic acids, and the ester acids such as glycolyl acid malonate COOH—CH₂—O—CO—CH₂COOH, ethylene bis (acid sulphate)

$$OH\text{—}SO_2\text{—}O\text{—}C_2H_4\text{—}O\text{—}SO_2\text{—}OH$$

the acid carbonate of lactyl lactic acid

COOH—CH(CH₃)—O—CO—CH(CH₃)—
O—CO—OH, diglycolyl oxalate
COOH—CH₂—O—CO—CO—O—CH₂—COOH Because the paucity of descriptive language has compelled the classification of the esters by means of their component acids and alcohols, the expression "polyacid" may include polyacids which are not known to exist in stable form such as

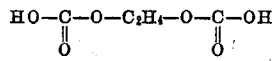

It is apparent that the preparation of the esters need not involve the synthesis of the acid.

The expression "polyhydroxy compound" is intended to be generic to all compounds having two or more hydroxyl groups which do not have any free acid groups. The hydroxy groups must obviously not be attached to carbonyl groups.

The expression includes the polyhydroxy alcohols such as ethylene glycol, propylene glycol, butylene glycol, trimethylene glycol, pentamethylene glycol, glycerine, methyl glycerol, erythritol, or pentaerythrite; the sugars such as glucose, lactose, sucrose, or maltose; the polyhydroxy ethers such as di-, tri-, and tetraethylene glycol, di-, tri-, and tetrapropylene glycol, etc.; the cyclic polyhydroxy compounds such as pyrogallol, hydroquinone, 2-5 bis (oxymethyl) furan, 3-5 dioxycumaron, dioxanediols, or p-p'-dihydroxy diphenyl ether, and the polyhydroxy esters such as ethylene dilactate

CH₃—CHOH—CO₂—C₂H₄—CO₂—CHOH—CH₃ bis (hydroxy ethyl) carbonate (HO—C₂H₄)₂—CO₃ glycol mono glycolate

HO—C₂H₄—O—CO—CH₂OH or diethylene glycol bis (hydroxy ethyl carbonate) (HOC₂H₄—CO₃—C₂H₄)₂O.

The expression "hydroxy acid" is used in the broad sense to include all compounds having both acidic and nonacidic hydroxyl groups. The generic expression includes aliphatic hydroxy acids such as citric, tartaric, saccharic, malic, glyceric, lactic and glycolic acids, the aromatic hydroxy acids such as salicylic, gallic, resorcylic, phloritic and coumaric acids, and the heterocyclic hydroxy acids such as berberonic, alpha furyl glycolic, 3-oxy-cumaron carboxylic (2) acid

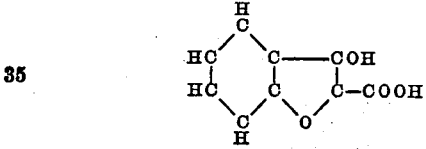

and the ester hydroxy acids including theoretical acids such as hydroxy ethyl carbonate

HO—C₂H₄—CO₂—OH lactyl lactic acid

CH₃—CHOH—CO₂—CH(CH₃)—COOH and diethylene glycol carbonate glycolic acid

OH—C₂H₄—O—C₂H₄—O—CO₂—CH₂COOH

It is necessary to differentiate between compounds which contain ester linkages between the reactive groups of the compound which separate the unsaturated alcohol radicals of the ultimate esters and those which do not. Accordingly, the expression "polyacidic ester" has been used herein to refer to the class of polyacidic compounds which contain at least one ester linkage between a pair of carboxyl groups. They, of course, contain at least two reactive acidic groups and may not contain reactive alcoholic hydroxy groups. The expressions "simple polyacid" or "simple polybasic acid" are used to denote compounds of more simple structure having no ester linkages in the molecules between the acid groups. Similarly, the expression "polyhydroxy esters" includes the compounds having at least two alcoholic hydroxy groups and no reactive acidic groups but which also contain at least one ester linkage between a pair of hydroxyl groups. The simple polyhydroxy compounds are acid-free compounds in which the hydroxyl groups are not separated by an ester linkage and the simple hydroxy acids are compounds containing acid and hydroxyl groups which are not separated by an ester linkage. These simple compounds may, however, contain more stable, less easily hydrolyzed groups such as ether or thioether groups. The compounds herein contemplated in some cases may also contain tertiary amino groups although it is preferred that the composition be nitrogen free since such products possess greater stability and yield polymers which are more stable and have other characteristics which render them more desirable than nitrogenous compounds.

For example, the compound derived by reacting allyl lactate with phosgene has the following probable structure:

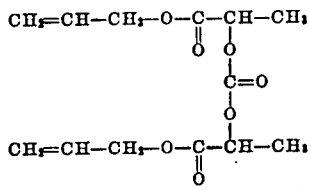

and may be considered to be an allyl ester of the polyacidic compound

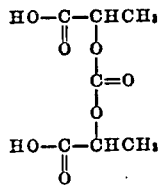

However, since this acid contains ester groups between the acid groups, it is not a simple polyacidic compound. In contrast, oxalic, malonic, or diglycolic acids are simple polyacidic compounds and the esters thereof are often designated herein as "simple polyacidic esters." Likewise, glycol or glycerol, etc. are simple polyhydroxy compounds and lactic and glycolic acids are simple hydroxy acids.

The new class of compounds are esters of unsaturated alcohols and polyacidic esters. The new esters contain at least two unsaturated hydrocarbon or substituted hydrocarbon radicals which are separated from each other by at least three ester linkages. These esters are not to be confused with alkyd resins which are not true chemical compounds but are mixtures of compounds of indefinite or unknown composition and which contain an indeterminate and usually very large number of ester linkages. Our esters are definite chemical compounds having fixed melting and boiling points and have a predetermined number of ester linkages, usually 3 to 8, between a pair of polymerizable unsaturated radicals. Thus, the new compounds have at least two unsaturated radicals having unsaturated carbon linkages and may be regarded as polyesters of a polyacidic compound containing from one to six ester groups between a pair of acid groups.

In addition, the compounds are nonresinous compounds of comparatively simple structure and do not, in general, contain more than eight ester linkages in any single chain. By "ester linkage" we mean a linkage through an oxygen atom linkage which is adjacent to a carbonyl group. Thus, a carbonate—

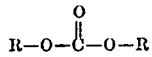

contains two ester linkages.

The unsaturated radicals may be derived from alcohols having from 2 to 10 carbon atoms and which have an unsaturated linkage in an aliphatic chain. Suitable alcohol radicals are those which may be regarded as derived from alcohols having 2 to 5 carbon atoms, for example, vinyl, allyl, isopropenyl, or other propenyl alcohol; the butenyl alcohols such as methallyl, crotyl, isocrotyl, or methyl vinyl carbinol; the various pentenols such as $\alpha$ or $\beta$ ethyl allyl, tiglyl or anglyl alcohols, dienols such as butadienyl alcohol or acetylenic alcohols such as propargyl alcohol, etc. Although the short chain alcohols are preferable, other unsaturated alcohols having 10 or less carbon atoms may be used, for example, linalyl alcohol and isopropyl ethynyl carbinol, and the araliphatic alcohols such as cinnamyl or phenyl propargyl alcohols. The halogen substituted products of the above alcohols are also useful such as 2-chlorallyl, chlorocrotyl, or 2-bromoallyl alcohols.

One type of unsaturated polyesters are the unsaturated alcohol esters and a polyacidic ester which polyacidic ester comprises an ester of a simple polyhydroxy compound and two or more molecules of simple polybasic acid. These compounds have the structure $$R_H-(R_A-(R_u)_{x-1})_y$$

in which $R_H$ is the organic radical derived from a polyhydroxy compound in which $y$ groups have been reacted with the polyacidic ester, $R_A$ is the radical derived from a simple polybasic acid having $x$ available acid groups, and $R_u$ is the radical derived from unsaturated monohydric alcohol.

This type of ester may be prepared by several methods. In accordance with one method these esters may be prepared by reacting unsaturated alcohol partial esters of simple polybasic acids (preferably those containing a single free acid group) such as allyl acid phthalate, allyl acid maleate, allyl acid fumarate, allyl acid adipate, diallyl tricarballylate, allyl methyl tricarballylate, allyl acid oxalate, or the corresponding vinyl, methallyl, crotyl, or 2-chlorallyl, etc. esters with simple polyhydroxy compounds, for example, glycols, glycerol, or other of the above mentioned simple polyhydroxy compounds. In such a case at least two of the acid groups should be linked to the simple polyhydroxy compound. Where the polyhydroxy compound contains more than two free hydroxy groups all of these groups may be reacted with the acid ester or the excess hydroxyl groups may be reacted with other acids such as oleic, ricinoleic, acetic, etc. or may be etherified.

In accordance with a further modification, glycol, glycerol or other simple polyhydroxy compound may be reacted with an excess of anhydride of a polybasic acid such as maleic, fumaric, phthalic, succinic, or adipic anhydride to form the corresponding bis, tris, or poly(carboxylic acid) esters of the polyhydroxy compounds such as glycol acid diphthalate, ethylene glycol acid disuccinate, ethylene glycol acid dimaleate, etc. These acids may then be reacted with allyl, methallyl, crotyl, or other alcohol, preferably in the presence of condensing agents.

In accordance with a further modification, the acid esters above mentioned such as allyl acid phthalate may be treated to form the corresponding acid chloride by means of thionyl chloride such as the mono acid chloride of allyl acid phthalate. These chlorides may then be reacted with glycerol, glycol, or similar polyhydroxy compound.

Alternatively, the new esters may be made by reaction of a silver or an alkali metal salt of the partial esters, for example, sodium allyl oxalate, sodium vinyl phthalate, potassium methallyl malonate, potassium methallylcarbonate, potassium chlorallyl carbonate, sodium crotyl diglycolate, sodium allyl dilactate, sodium methallyl adipate, sodium dimethallyl tricarballylate, sodium allyl glutarate, etc. with polyhalogenated compounds such as 1,2-dichlorethane, 1,3-dichlorpropane, β,β-dichloro diethyl ether, 1,2,3-tribromoisobutane, 1,4-dichloro-n-butane. Thus, unsaturated esters of the following structures can be prepared.

Diethylene glycol bis (crotyloxalate)

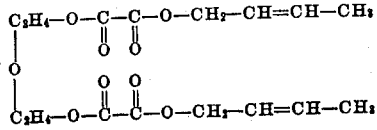

Ethylene glycol bis (divinyl trimesate)

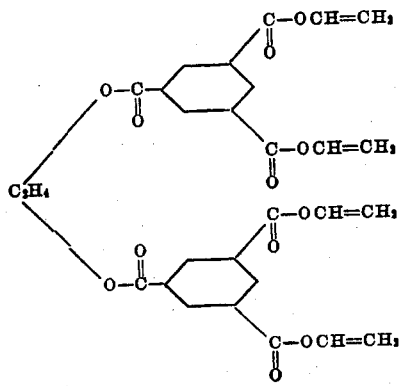

or glycerol tris (methallyl phthalate)

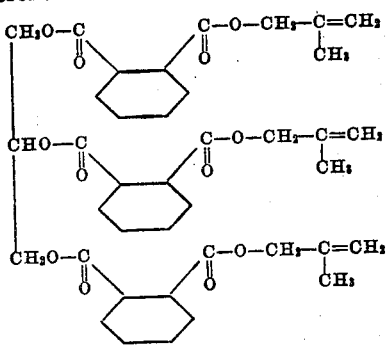

The carbonate esters may be prepared by reacting two or more moles of the chloroformates of the unsaturated alcohols with one mole of the above polyhydroxy compounds. The chloroformates of the unsaturated alcohols may be prepared by reacting the alcohol with phosgene, as described in copending application Serial No. 344,077, filed July 5, 1940.

Thus, carbonate esters such as the following may be prepared:

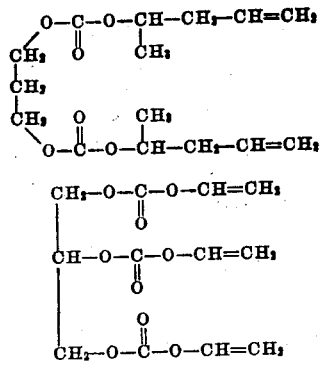

Alternatively, the polychloroformates of polyhydroxy compounds may be prepared and reacted with unsaturated alcohols to produce the same carbonate esters. The polychloroformates may be prepared by reacting the polyhydroxy compounds with phosgene as more fully described in copending cases of Irving E. Muskat and Franklin Strain, Serial No. 385,774, filed March 28, 1941, and Serial No. 385,776, filed March 28, 1941.

These esters are more fully described in Serial No. 361,280 filed October 15, 1940, by Irving E. Muskat and Franklin Strain, of which this case is a continuation-in-part, and have been referred to therein as polyesters of (a) a polyhydroxy compound and (b) an acid ester of an unsaturated alcohol and a polybasic acid. It will be apparent that such compounds may be retarded as unsaturated alcohol polyesters of a polyacidic compound wherein the polyacidic compound is a polyester of a polyhydroxy compound and a plurality of moles of polybasic acid, said polybasic acid having only one group esterified with the hydroxy group of the polyhydroxy compound.

The following examples are illustrative of this phase of the invention:

*Example I*

Allyl chloroformate (7.3 moles) was added dropwise to a solution of 3.3 moles of triethylene glycol in 8 moles of pyridine while cooling the reaction mixture to a temperature of 5 to 10° C. After the chloroformate had been added, the mixture was allowed to stand at room temperature for about an hour and the ester washed with dilute aicd and water and purified by vacuum distillation. The triethylene glycol bis (allyl carbonate) obtained was a colorless liquid which had an index of refraction ($n_D^{20}$) of 1.452 and a density ($d_4^{20}$) of 1.135. The probable formula of this compound was as follows:

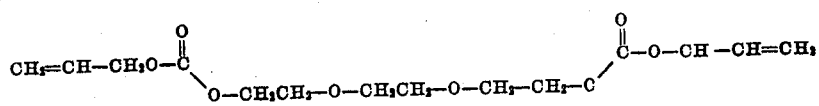

*Example II*

1000 g. of ethylene glycol acid diphthalate was mixed with 7000 g. of allyl alcohol and approximately one percent HCl gas was introduced. The mixture was allowed to stand at 15 to 25° C. for 36 hours after which the HCl and water were distilled off. The ethylene glycol di(allyl phthalate) was extracted with ether, washed with aqueous sodium carbonate solution and the ether was distilled off. Thereafter, the ester was dried over calcium chloride. The product thus obtained is a high boiling colorless liquid which polymerized by heating at 100° C. in the presence of 5 percent benzoyl peroxide.

*Example III*

A quantity of polyvinyl alcohol was dissolved by heating with about 10 times its weight of pyridine for 16 hours at 85° C. The solution was cooled to about 0° C. and mixed with cold allyl chloroformate while maintaining the temperature at 5 to 7° C. The mixture was stirred, warmed to 40° C. and poured into water slightly acidified with hydrochloric acid. A white sticky gum was precipitated. This gum was dissolved, reprecipitated with water from acetone solution and a tough, white polymer was obtained. This product cured to an infusible, insoluble state upon heating with 5 percent benzoyl peroxide.

*Example IV*

Three moles of allyl alcohol was heated with one mole of ethylene glycol dihydrogen diphthalate in the presence of benzene and small quantities of hydroquinone and benzene sulfonic acid. The water formed during the reaction was distilled off with benzene as formed and the benzene returned to the system. Heating was continued until evolution of water ceased and after washing and drying, a colorless, viscous, oily liquid was obtained. This liquid polymerized readily upon heating at 100° C. in the presence of 2 percent by weight of benzoyl peroxide.

*Example V*

To a mixture of 150 g. of allyl alcohol and 187 g. of ethylene glycol bis (chloroformate) was added slowly with stirring, 200 g. of cold 50 percent aqueous sodium hydroxide, keeping the temperature at 0–5° C. The reaction mixture was diluted with water and the oily ester separated and distilled. Colorless glycol bis (allyl carbonate) B. P. 130–140° C. at 1–2 mm. pressure was obtained.

*Example VI*

Phosgene was bubbled into a flask containing allyl alcohol at a rate of 20 millimoles per minute while agitating the mixture and cooling to a temperature below about 15 to 20° C. After phosgene in the proportion of about 0.9 mole of phosgene per mole of allyl alcohol had been introduced, the mixture was allowed to stand for one hour. Thereafter, the reaction mixture was washed with water to remove unreacted allyl alcohol and dried over calcium chloride.

2.2 moles of the allyl chloroformate was prepared as above and added dropwise to a solution of one mole of ethylene glycol in 2.4 moles of pyridine while cooling the reaction mixture to a temperature of 5–10° C. After the chloroformate had been added, the mixture was allowed to stand at room temperature for about one hour. The product was diluted with water, washed with dilute HCl solution and then with sodium chloride solution until the product was neutral. Thereafter, the product was washed with water and dried over calcium chloride. The ethylene glycol bis (allyl carbonate) having a boiling point of about 118–122° C. at 1 mm., an index of refraction of about 1.4443 ($n_D^{20}$), a density ($d_4^{20}$) of about 1.114, and having the probable formula

was obtained.

A quantity of the ethylene glycol bis (allyl carbonate) was dissolved in an equal weight of dioxane and 4 percent benzoyl peroxide on the basis of the weight of the monomer was introduced. The solution was heated, with stirring, at 80 to 85° C. until the viscosity had increased noticeably. Thereafter, the mixture was cooled and methanol was added to the point of turbidity. It was then added to 5 volumes of methanol with vigorous stirring. The polymer was separated by decantation, dissolved in acetone, reprecipitated with methanol and again recovered. The polymer was then dried under subatmospheric pressure to constant weight. A white granular solid was obtained. A quantity of this polymer was mixed with 5 percent benzoyl peroxide, placed in a mold and heated to 145° C. under a pressure of 2000 lbs. per sq. in. for 15 minutes and a transparent sheet of infusible, insoluble polymer was obtained.

*Example VII*

Five moles (935 gms.) of distilled ethylene glycol bis (chloroformate) was added slowly to a mixture of 929 cc. of methallyl alcohol (10% excess) and 954 cc. of pyridine (20% excess). The addition was made at a rate of 1.5 moles per hour and the temperature maintained at about 5° C. After the reaction mixture had been permitted to warm to room temperature, it was diluted with water. The ester was washed successively with 5 percent sulphuric acid, 5 percent caustic soda and water. It was decolorized with charcoal by heating at 80–100° C. while evacuating at 15 mm. to remove methallyl alcohol. 915 gms. of ethylene bis (methallyl carbonate) were collected between 135 and 145° C. by distillation at a pressure of 3 mm.

This compound has the following structure:

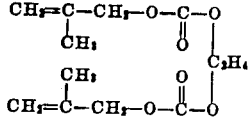

This product has a density ($d_4^{20}$) of 1.103 and an index of refraction ($n_D^{20}$) of 1.4489.

A 10 gram sample was mixed with 5 percent benzoyl peroxide and polymerized by heating at 85° C. for one hour. A hard, colorless and transparent polymer was produced.

*Example VIII*

79 g. of allyl acid succinate made by partial esterification of succinic anhydride with allyl alcohol was suspended in 300 cc. of benzene and treated with 115 g. of thionyl chloride. The thionyl chloride was added while the benzene solution was cold. After an hour the mixture was warmed slowly to the reflux temperature and finally refluxed for two hours. The resulting benzene solution of the allyl succinyl chloride was then cooled to +5° C. and 16 g. of glycol were added. An excess of pyridine (80 g.) was then added slowly to the mixture over a period of one hour. The benzene solution of the water was washed with dilute HCl until neutral and then dried over anhydrous sodium sulphate. The benzene and other volatile impurities were removed by heating at reduced pressures. The solid unsaturated ester had the structure:

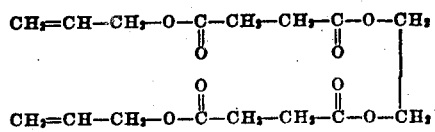

A second type of these unsaturated esters comprises the esters of (a) an unsaturated alcohol and (b) a polyacidic ester which is an ester of a simple dibasic acid and a polyhydroxy ester which polyhydroxy ester is a polyester of a simple polybasic acid and a simple polyhydroxy compound.

These unsaturated esters may be prepared by reacting a simple polybasic acid with monohydroxy esters of (a) a polyhydroxy compound and (b) one or more molecules of a partial ester of a dibasic acid and an unsaturated alcohol. Monohydroxy esters such as glycerol bis (methallyl succinate), ethylene glycol mono (allyl malonate), diethylene glycol mono (chlorallyl phthalate), propylene glycol crotyl dilactate, trimethylene glycol vinyl adipate, triethylene glycol methylvinylcarbinyl diglycolate, etc. are prepared by reacting the polyhydroxy compound or the corresponding oxide such as ethylene oxide, propylene oxide, epoxy compounds, etc. with a quantity of one of the above-mentioned partial esters of an unsaturated alcohol and a polybasic acid such as vinyl acid phthalate, methallyl acid adipate, allyl acid succinate, crotyl acid adipate, chlorallyl acid dilactate, methallyl acid succinate, or allyl acid glutarate, which is sufficient to react all but one of the hydroxy groups on the polyhydroxy compound. The reaction of a polybasic acid or the polyacid chloride thereof such as oxalyl chloride, phthalyl chloride, succinyl chloride or phosgene with the above hydroxy esters will produce the corresponding polyesters such as the following:

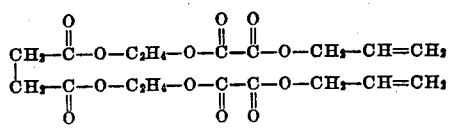

and

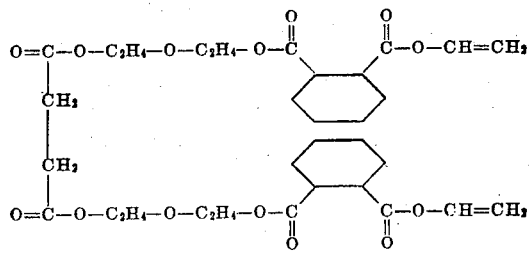

Where the polyacidic compound is dibasic and the polyhydroxy compound is a dihydroxy compound, the compound has the following structure:

$$RXYX_1Y_1X_2R_1$$

where R and $R_1$ are unsaturated radicals X, $X_1$, and $X_2$ are radicals of the polybasic acids and Y and $Y_1$ are radicals of the polyhydroxy compounds.

The above compounds may also be prepared by reacting compounds having chlorine substituted for the hydroxy groups such as a corresponding ester of glycerol monochlorhydrin and the sodium salts of the acidic compounds, analogous to the methods described for making the first type of these unsaturated esters. Other methods may be used which are well known in the art of making other known esters.

The carbonate esters of this second type may be prepared by reacting a chloroformate of an unsaturated alcohol with a polyhydroxy compound under such conditions that all but one of the hydroxy groups are reacted with the chloroformates. Two moles of the resulting monohydroxy esters such as ethylene glycol mono allyl carbonate, propylene glycol mono methallyl carbonate, glycerol bis (chlorallyl carbonate), pentaerythritol tris (allyl carbonate) tri methylene glycol mono crotyl carbonate, diethylene glycol mono methylvinylcarbinyl carbonate, resorcinol monomethallyl carbonate or tetraethylene mono allyl carbonate may then be treated with a single mole of phosgene in the presence of a suitable alkaline agent to produce unsaturated esters such as:

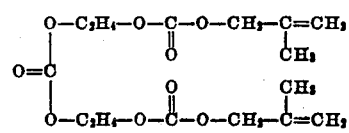

or

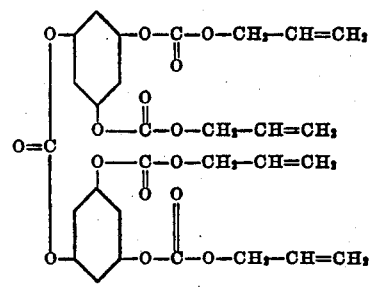

The following examples are illustrative:

Example IX

Two moles of phthalic anhydride (296 g.) were reacted with an equivalent proportion of crotyl alcohol (144 g.) to produce the crotyl acid phthalate. This was converted to the sodium salt by adding an aqueous solution containing 50% sodium hydroxide to neutralize the product, care being taken to avoid excess NaOH. Two moles of ethylene chlorhydrin were added and the mixture heated gently for several hours. The product was freed of volatile impurities by heating at reduced pressures. The material was then mixed with 1000 cc. of carbon tetrachloride and phosgene passed in at the rate of 25-50 millimoles per minute for one hour. Appreciable quantities of the ester of the following structure was formed:

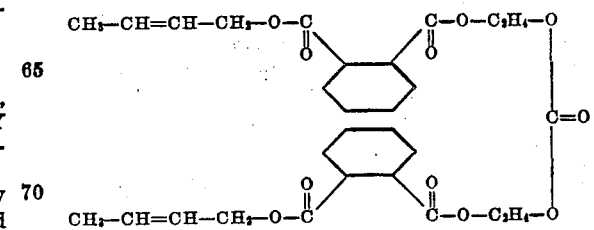

This compound was heated at 150° C. in the presence of 5 percent acetone peroxide. A hard translucent solid was produced.

Compounds of the following nature may be thus formed:

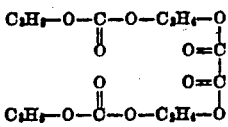

or

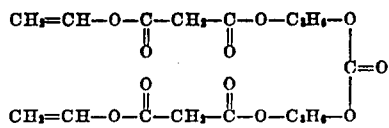

A third type of unsaturated ester is the polyester of (a) unsaturated alcohol and (b) a polyacidic ester which comprises an ester of a simple polyacid and a polyhydroxy ester, which polyhydroxy ester comprises an ester of a simple polyhydroxy compound and one or more molecular equivalents of simple hydroxy acid. Where the hydroxy acid contains a single hydroxy group and a single acid group, the acid contains two acid groups and the hydroxy compound contains two hydroxy groups. The compound has the following structure:

$RXZYX_1 R_1$ or $RXZYZ_1 X_1 R_1$ where R and $R_1$ are unsaturated, X and $X_1$ are radicals derived from the polyacidic compound, Z and $Z_1$ are radicals derived from the hydroxy acid and Y is a radical derived from the polyhydroxy compound.

These compounds may be prepared by reacting a salt such as an alkali metal or silver salt of an unsaturated alcohol partial ester of a polybasic acid such as allyl acid phthalate, methallyl acid diglycolate, vinyl acid oxalate, 2-chlorallyl acid mabnate, allyl acid maleate, methallyl acid succinate, mono- or diallyl acid tricarballylate, etc., with a halogen substituted carboxylic acid such as chloroacetic, chloropropionic, chloroacrylic, bromoacetic, etc., an alkali metal or silver salt thereof to produce an ester containing a free acid group such as allyloxyoxalyloxyacetic acid (ester of allyl acid oxalate and glycollic acid), methallyl oxysuccinyloxypropionic acid, chorallyl oxymalonyloxy acetic acid, allyloxy maleyloxypropionic acid, methallyloxyoxalyloxybutyric acid, methallyloloxymalonyloxyacrylic acid, allyloxydilactyloxyacetic acid, many of which have the general formula

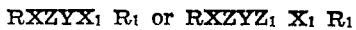

in which $R_1$ is the radical from unsaturated alcohol, $R_2$ is the radical derived from the polycarboxylic acid, and $R_3$ is the radical derived from the halogen acid. Two or more moles of this acidic ester may then be reacted with polyhydroxy compounds to produce the unsaturated esters such as:

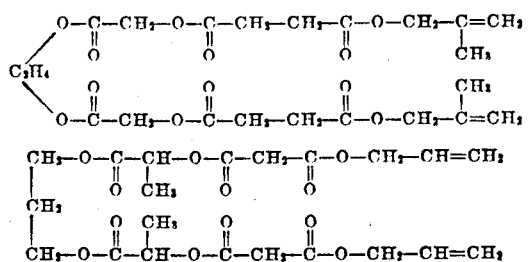

diethylene glycol bis (vinyl oxymaleyl oxyacetate)

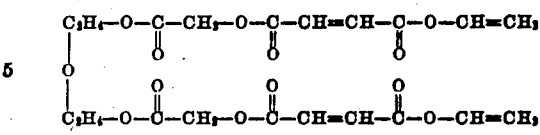

Alternatively, one or more moles of the acidic esters mentioned in the previous paragraph may be esterified with a single mole of a glycol or other polyhydroxy compound to produce hydroxy esters such as ethylene glycol mono methallyl oxyoxalyl oxyacetate, propylene glycol mono allyl oxyphthalyl oxyacetate, propylene glycol mono allyl oxymalonyl oxypropionate, diethylene glycol mono chlorallyl oxysuccinyl oxyacetate, trimethylene glycol mono methallyl oxalyloxypropionate, or glycerol bis (or mono) allyl oxymalonyl oxyacetate, etc. These hydroxy esters are then reacted with chemically equivalent quantities of partial esters of dibasic acids and unsaturated alcohol such as allyl acid succinate, methallyl acid maleate, vinyl acid phthalate, methallyl acid oxalate, chlorallyl acid dilactate, allyl acid adipate, crotyl acid malonate, etc. to produce unsaturated polyesters such as:

glycerol 1-vinyl oxalate 2,3-bis(methallyloxyoxalyl oxyacetate).

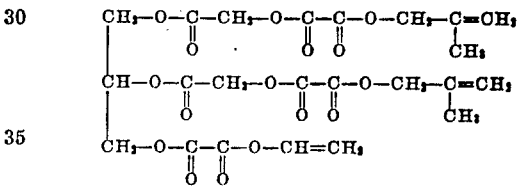

ethylene glycol allyl oxymalonyl oxypropionate methallyl oxalate

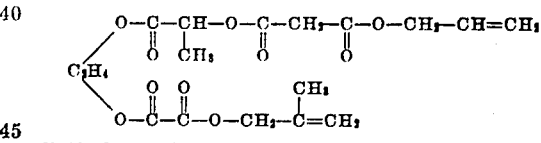

diethylene glycol methallyl oxyoxalyl oxyacetate methallyl phthalate

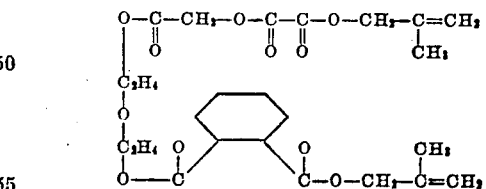

In accordance with a further method, the esters may be prepared by reaction of (a) a mono or polyester of an hydroxy acid and a polyhydroxy compound such as ethylene glycol mono glycollate, ethylene glycol monolactate, ethylene glycol monoricinoleate, propylene glycol mono lactate, glycerol mono lactate, glycerol monoglycollate, resorcinol mono lactate, etc., or the corresponding polyesters such as castor oil, glycol dilactate, glycerol trilactate, etc., with (b) an acid ester of an unsaturated alcohol and a polybasic acid such as allyl acid phthalate, allyl acid maleate, allyl acid fumarate, allyl acid succinate, or adipate, or the corresponding methallyl, crotyl, or other unsaturated esters, or the corresponding acid chlorides may be used in lieu of the acid esters. For example, castor oil, glycol monolactate or glycol dilactate may be reacted, preferably in the presence of a base, with an unsaturated chloroformyl derivative such as allyl malonyl chloride, allyl maleyl chloride, allyl phthalyl chloride, etc. to form the corresponding ester.

The carbonate esters of the third type of unsaturated esters may be prepared by preparing an ester of a polyhydroxy compound and an hydroxy acid such as ethylene glycol dilactate, diethylene glycol diglycolate, propylene glycol disalicylate, trimethylene glycol dilactate, ethylene glycol dihydra-acrylate, diethylene glycol dileucinate, glycerol triglycolate, glycerol dilactate, glycerol mono salicylate, ethylene glycol mono glycolate, etc. These hydroxy esters are then treated with a chemical equivalent of a chloroformate of an unsaturated monohydric alcohol in the presence of an alkaline agent such as pyridine, sodium hydroxide, sodium carbonate, etc. to produce neutral polyesters such as follows:

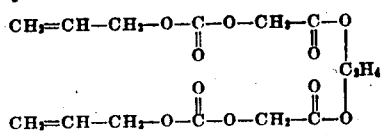

glycerol -1- methallyl-carbonyldioxy-propionate 2,3-bis (methallyl carbonate)

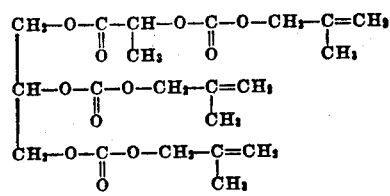

diethylene glycol chloroallyl carbonylidioxy hydracrylate chloroallyl carbonate.

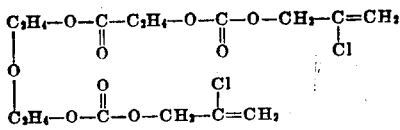

Other methods of preparation analogous to methods of making known esters will be apparent from the following examples:

Example X

Approximately 1 mole (106 g.) of diethylene glycol was heated with 2 moles (152 g.) of glycolic acid in 500 cc. of carbon tetrachloride. The flask was equipped with condenser and a means of separating the immiscible liquids from the condensate. The carbon tetrachloride was returned to the reaction vessel. After 10 hours of heating at 75–80° C. a substantial quantity of diethylene glycol diglycolate was formed. This material was then esterified with 2 moles of allyl acid succinate, prepared by adding 1 mole of allyl alcohol to 1 mole of succinic anhydride. The esterification was conducted in the carbon tetrachloride medium at a temperature of 70–80° C. The compound produced was believed to have the following structure:

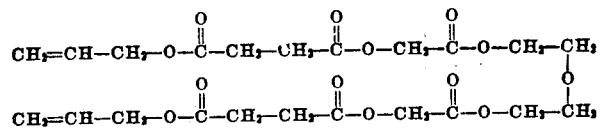

This product which was a high boiling liquid was heated with 5 percent benzoyl peroxide in 500 cc. of toluene at a temperature of 90–100° C. for 2 hours. At this time the viscosity of the mixture had increased appreciably. A soft fusible polymer was obtained by addition of 500 cc. of methyl alcohol. 10 g. of the soft polymer were mixed with an additional quantity of benzoyl peroxide and heated for 15 minutes at 150° C. under 2000 lbs. per sq. in. pressure. A hard, transparent composition was obtained.

Example XI

One mole of ethylene glycol dilactate (206 g.) was mixed with two moles of allyl phthalyl chloride (453 g.) and one liter of benzene. The mixture was cooled to +5° C. and 2.2 moles of pyridine (200 g.) was added slowly at a rate of approximately 30–40 millimoles per minute. During the reaction the temperature was maintained between +5 and +15° C. by cooling on an ice bath. After the addition of pyridine was completed the reaction was permitted to stand for three hours while the mass warmed to room temperature. The ester was then separated from the benzene and pyridine hydrochloride by evaporating under reduced pressure.

The ester became polymerized by heating at 80° C. for one hour with 4 percent benzoyl peroxide. The ester had the structure:

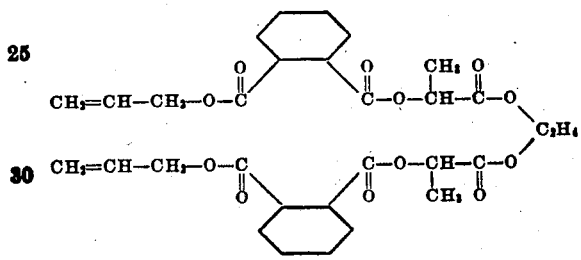

Example XII

Allyl chloroformate (12.1 parts by weight) was slowly added to 16.4 parts by weight of castor oil in the presence of an excess of pyridine. The product was washed successively with water, dilute hydrochloric acid and then with water. Thereafter, the product was heated to 100° C. to remove volatile impurities. The product obtained was a liquid which was soluble in petroleum ether.

Example XIII

Two moles of methally chloroformate was mixed with one mole of ethylene glycol mono lactate. Thereafter, 3 moles of NaOH in the form of a 50 percent aqueous solution was slowly added with stirring, while maintaining the temperature at 0 to 5° C. The product was purified by washing with water until a neutral product was obtained and then heating under a vacuum to drive off volatile impurities. The resulting ester is a high boiling liquid having the following probable formula:

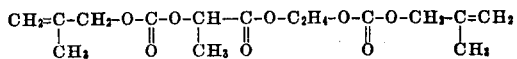

Example XIV

Glyceryl trilactate was prepared by reaction of glycerol with 3 moles of lactic acid (270 g.) followed by distillation of the ester. Three moles of allyl chloroformate and four moles of pyridine were added slowly over a period of 1 and ½ hours while maintaining the temperature between 0 and 15° C. Throughout the reaction the mixture was agitated by mechanical means. The product was washed with water and dried over calcium chloride. Its molecular constitution was believed to be:

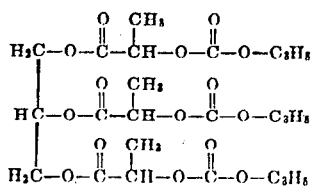

The compound polymerized readily to a hard, translucent solid.

A fourth type of unsaturated ester is the polyester of (a) an unsaturated alcohol and (b) a polyacidic ester which comprises an ester of a simple polybasic acid and one or more molecular equivalents of a simple hydroxy acid.

Where the hydroxy acid contains a single hydroxy group and a single acid group and the polyacidic compound is dibasic the compound has the following composition:

R Z X R₁, or R Z X Z₁ R₁ where R and R₁ are unsaturated radicals, Z and Z₁ are radicals derived from the hydroxy acids and X is the radical derived from the polyacidic compound.

This type of ester may be prepared by reacting an ester of an unsaturated alcohol and an hydroxy acid such as allyl lactate, methallyl glycollate, methallyl salicylate, allyl leucinate, methallyl phloritate, mono methyl mono allyl tartrate, mono stearyl mono allyl tartrate, diallyl tartrate, trimethallyl citrate, dichlorallyl malate, allyl glycerate, etc., with chemical equivalents of the partial esters of unsaturated alcohols and dibasic acids such as allyl acid oxalate, methallyl acid phthalate, chlorallyl acid malonate, crotyl acid oxalate, vinyl acid succinate, methallyl acid maleate or allyl acid adipate or the corresponding chloroformyl esters such as allyl phthalyl chloride, allyl oxalyl chloride, allyl malonyl chloride, allyl succinyl chloride or the corresponding methallyl derivatives to produce unsaturated esters such as:

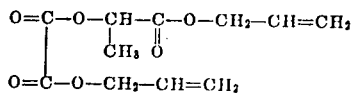

or

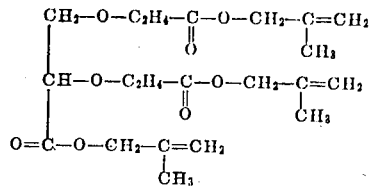

Alternatively, similar esters may be prepared by reacting two or more moles of the hydroxy esters of unsaturated alcohols and hydroxy acid with polycarboxylic acids or acid chlorides thereof such as succinyl, adipyl, oxallyl or phthalyl chlorides. Thus, the following unsaturated esters may be produced:

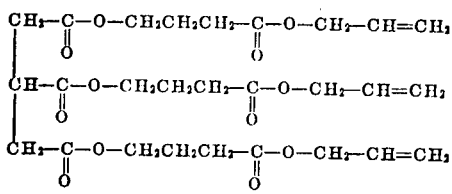

or

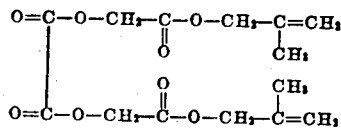

The carbonate modification of this fourth type of unsaturated ester may be prepared by treating the hydroxy ester of unsaturated alcohol and hydroxy acid with a chloroformate of an unsaturated monohydric alcohol. Thus, the following unsaturated esters may be prepared:

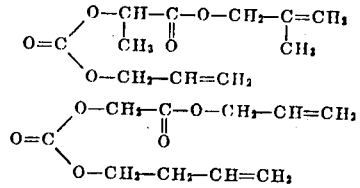

Other carbonate esters may be prepared by reacting two moles of a monohydroxy ester of an unsaturated alcohol and a simple hydroxy acid such as allyl lactate, methallyl glycolate, chlorallyl hydracrylate, methallyl salicylate, allyl leucinate, diallylmalate, trimethallyl citrate, etc. with phosgene in the presence of an alklaline reagent. Thus, the following carbonates are produced:

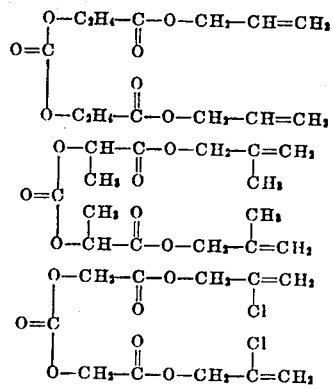

Other methods of preparation will be apparent from the following examples:

*Example XV*

365 parts by weight of allyl chloroformate was added, over a period of 2 and 2½ hours to 357 parts by weight of allyllactate dispersed in 268 cc. of pyridine with stirring and at a temperature of 2 to 18° C. The reaction mixture was acidified to the methyl orange endpoint, washed with water, dilute hydrochloric acid, dilute aqueous sodium carbonate solution, again with water, and was finally dried over anhydrous sodium carbonate. The product was thereafter purified by distillation. This product boiled at about 112° C. at a pressure of 2 mm. of mercury and had a refractive index ($N_D^{20}$) of about 1.438 and a density of ($d_4^{20}$) of about 1.064. The molecular structure of this compound is:

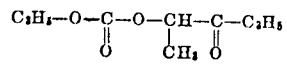

*Example XVI*

1.2 moles of vinyl chloroacetate was slowly added to one mole of monosodium allyl phthalate containing a small quantity of hydro-quinone while heating to a temperature of about 75 to 95° C. The reaction mixture was washed with water and then with aqueous sodium carbonate solution until the solution is faintly alkaline. The product, allyl phthalyl vinyl glycolate, was a high boiling, viscous colorless liquid. Upon heating this liquid in the presence of 5 percent of benzoyl peroxide a transparent polymer was secured. The molecular structure of the monomer is as follows:

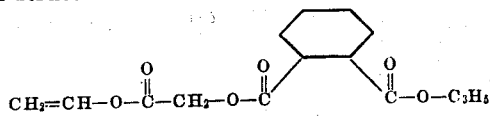

Example XVII 95 parts of allyl salicylate was dissolved in 250 parts of acetone and 22 parts of sodium hydroxide dissolved in water was slowly added. During this addition a stream of phosgene was passed into the solution and the temperature of the solution was maintained below about 15° C. The reaction mixture was diluted with cold water and the solid carbonate precipitated. This ester was washed with water and recrystallized from alcohol. It possessed a melting point of 51–53° C. The product was the carbonate diester of allyl salicylate. Its structure was as follows:

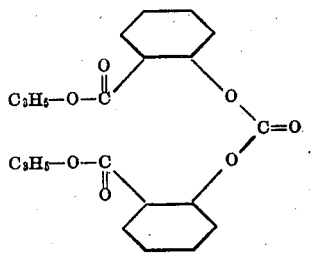

Example XVIII

Phosgene was bubbled into a flask containing a solution containing 1690 gms. of allyl lactate per liter of pyridine at a rate of 20 millimoles per minute while agitating the mixture and cooling to a temperature below about 15 to 20° C. After phosgene in the proportion of about 0.5 mole of phosgene per mole of allyl lactate had been introduced, the mixture was allowed to stand for one hour. Thereafter, the reaction mixture was acidified to the methyl orange endpoint and washed successively with equal volumes of water, dilute hydrochloric acid and dilute aqueous sodium hydroxide and finally twice with water. The product was a colorless liquid which boiled at about 154° C. at a pressure of 4 mm. of mercury and had a density ($d_4^{20}$) of 1.22 and an index of refraction ($N_D^{20}$) of about 1.447. The molecular structure of this compound is:

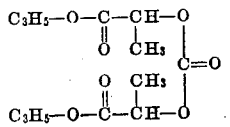

Example XIX

One mole (162 g.) of lactyl lactic acid was mixed with 58 gms. of allyl alcohol and refluxed for three hours with 500 cc. of xylene, 1.5 gms. of pyrogallol and 120 gms. of allyl chloroformate. One and one-third moles of NaOH (54 gms.) in 100 cc. of water was added dropwise over a period of one hour during which reaction temperature was maintained between 0° C. and 10° C. The resulting ester was believed to have the structure:

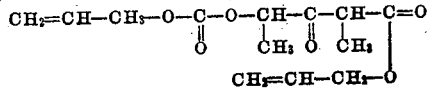

A sample was polymerized to a hard brittle solid when heated with 3 percent benzoyl peroxide for one hour at a temperature of 90° C.

Example XX

Allyl lactate (40 g.) and pyridine (48 gms.) were mixed with 100 cc. of CHCl₃ in a 3-neck 500 cc. flask equipped with dropping funnel, stirrer and thermometer. The mixture was cooled to −2° C. in a salt-ice bath and was maintained below +15° C. during the addition of 46 gms. of adipyl chloride which was dropped in slowly over a period of 50 minutes. The mixture was stirred for three hrs. while the temperature was permitted to rise to 20° C. The solution was then washed with water, 1 N HCl, saturated NaHCO₃ and again with water. It was dried over Na₂SO₄. The solvent was evaporated in vacuo by heating slowly to 100° C. The temperature was maintained at 100° C. for ½ hour at 16 mm. total pressure. The ester was found to have a density ($d_{15}^{24}$) of 1.102 and an index of refraction ($n_D^{20}$) of 1.4540. The ester was believed to have the structure:

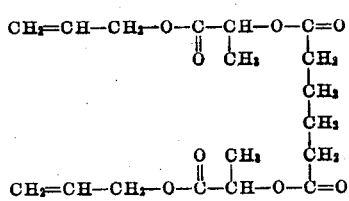

A sample of 1.76 g. of the product was mixed with 5 percent peroxide and heated at 70° C. for 30 hours. A hard, tough polymer was produced.

A fifth class of unsaturated esters contains the ester of an unsaturated alcohol and a polyacidic ester which is a mono or polyester of a simple hydroxy acid with a polyacidic ester, which polyacidic ester is a polyester of a simple polyhydroxy compound and two or more moles of simple polybasic acids.

Where the hydroxy acid contains but one hydroxyl and one acid group and where the polybasic acid is dibasic and the polyhydroxy compound is dihydroxy, the compounds have the following structural formula:

R—Z—X—Y—X₁—R₁ or R—ZX—Y—X₁—Z₁R₁

These unsaturated esters may be produced by reacting two or more moles of (a) partial esters of dibasic acids and (b) hydroxy esters of unsaturated alcohol and simple hydroxy acid such as acid methallyl oxycarbonyl methylene oxalate, acid allyl oxycarbonyl ethylidene malonate, acid chlorallyl oxycarbonyl methylene succinate, acid allyl oxycarbonyl ethylene oxalate, acid methallyl oxycarbonyl trimethylene diglycolate, acid methallyl oxycarbonyl ethylidene oxalate, etc. with a polyhydroxy compound containing a chemical equivalent of reactive hydroxyl groups. Thus, the following compounds may be produced:

glycerol tris (allyl oxycarbonyl ethylene oxalate)

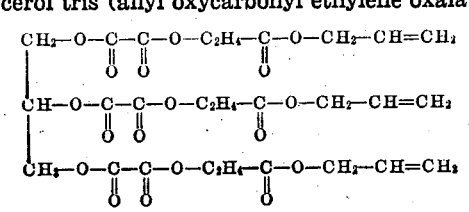

ethylene glycol bis (methallyl oxycarbonyl ethylidene malonate)

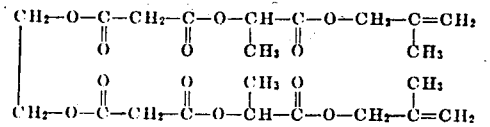

diethylene glycol bis (allyloxycarbonyl ethylidene oxalate)

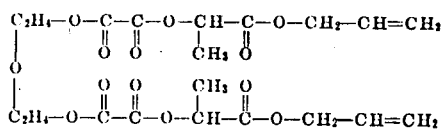

The acidic esters mentioned in the previous paragraph may alternatively be reacted with a chemically equivalent quantity of an hydroxy ester of (a) a polyhydroxy compound and (b) one or more moles of an acid ester of unsaturated alcohol and dibasic acid such as glycerol bis (allyl oxalate), glycerol mono allyl phthalate, diethylene glycol mono methallyl malonate, ethylene glycol mono chlorallyl succinate, propylene glycol mono allyl dilactate, trimethylene glycol mono methallyl diglycolate, triethylene glycol mono allyl oxalate, etc. to produce unsaturated esters as follows:

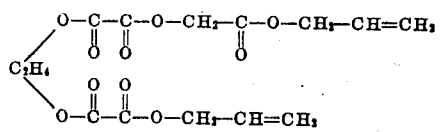

or

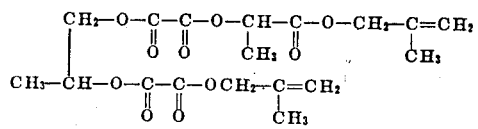

or

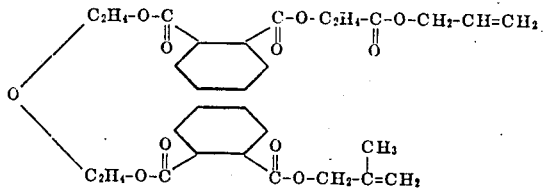

These esters may also be produced by treatment of a polyhydric alcohol with a polybasic agent to form a di- or polyacid ester. For example, phthalic or succinic or other anhydride may be reacted with ethylene glycol or other polyhydroxy compound to form ethylene or similar di acid esters such as ethylene glycol acid diphthalate, glycerol acid triphthalate, diethylene glycol acid diphthalate, or the corresponding maleate, fumarate, succinate, etc. Thereafter, these esters may be treated with thionyl chloride to form the corresponding acid chlorides. These acid chlorides may be reacted with unsaturated esters of hydroxy acids, preferably in the presence of some alkali.

In addition, acid esters of (a) hydroxy acids which are esterified with unsaturated alcohols such as allyl lactate or glycollate, and (b) polybasic acids may be reacted with glycol or other polyhydroxy compound. For example, the acid sulphate of glycollic acid allyl ester may be reacted with a glycol, glycerol, diethylene glycol, etc. to form esters containing two or more allyl groups. The acid phthalate or acid succinate of allyl or other unsaturated glycolate or lactate may be similarly treated or the acid esters may be converted to acid chlorides by means of thionyl chloride and these products reacted with polyhydroxy compounds.

The unsaturated carbonate esters of the fifth class may be prepared by reacting two or more molecules of a chloroformate of an hydroxy ester of unsaturated alcohol and simple hydroxy acid such as allyl lactate chloroformate, methallyl glycolate chloroformate, chlorallyl lactate chloroformate, allyl hydracrylate chloroformate, crotyl glycolate chloroformate, etc. with a glycol, glycerol or other polyhydroxy compound. The chloroformates are prepared by reaction of phosgene upon the hydroxy esters. Compounds such as the following are thus produced:

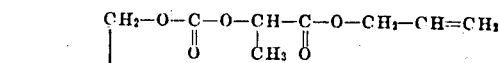

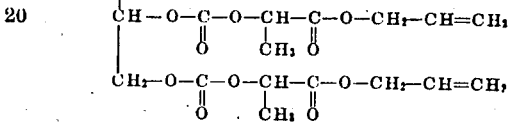

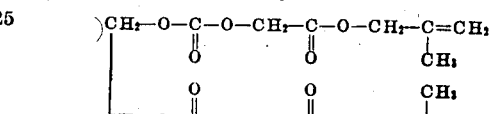

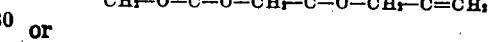

or

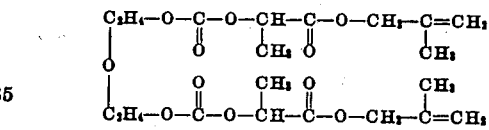

The chloroformates of the hydroxy esters may alternatively be reacted with an hydroxy ester of (a) a glycol, glycerol, or other polyhydroxy compound and (b) a partial ester of unsaturated alcohol and a dibasic acid. These hydroxy esters such as glycerol bis (allyl carbonate), ethylene glycol mono methallyl oxalate, diethylene glycol mono chloroallyl oxalate, trimethylene glycol mono methallyl carbonate, propylene glycol mono allyl phthalate, etc. may be reacted with chemically equivalent quantities of the above chloroformates of hydroxy esters to produce compounds such as:

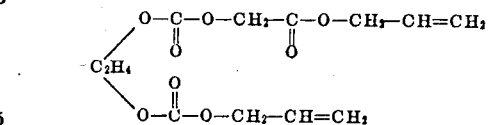

Alternatively, the esters may be prepared by reaction of a polychloroformate of a polyhydroxy compound such as ethylene glycol bis chloroformate, triethylene glycol bis chloroformate with an unsaturated alcohol ester of an hydroxy acid such as allyl lactate, methallyl lactate, allyl salicylate, allyl glycollate, or other similar esters.

Other methods of preparation will be apparent from the following examples:

*Example XXI*

Sixty-two grams of ethylene glycol were added gradually to 184 grams of succinic anhydride. The temperature was maintained between 130–135° C. for two hours to effect the esterification. Two moles of methallyl glycollate were then added and the mixture refluxed for another two hours. The products were then washed, dried and heated at atmospheric pressure to remove the dioxane. The product was then purified by heating in a vacuum. This material polymerized in the presence of benzoyl peroxide to form a glass-like product. The monomer is believed to have the following structure:

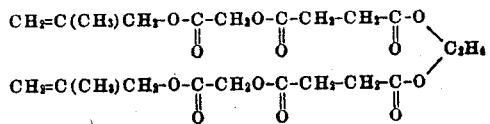

Example XXII

One mole of allyl lactate (130 gms.) was treated with phosgene at a temperature between +10 and +30° C. maintained by an ice bath until approximately one mole of phosgene had been introduced. In about one hour the reaction was substantially complete. The resulting chloroformate of allyl lactate was mixed with approximately one-half a molecular equivalent of diethylene glycol (50 gms.) and 100 gms. of sodium hydroxide in a 50 percent water solution was slowly added to the mixture with stirring while maintaining the temperature at 0–5° C. The resulting ester was separated from the water layer and purified by washing with water and heating in vacuum to vaporize the more volatile constituents. The ester has the following formula:

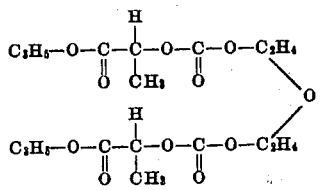

It was polymerized by heating to 150° C.

Example XXIII

One mole of ethylene bis (chloroformate) (187 gms.) was mixed with 232 gms. of allyl glycolate and 200 gms. of 50 percent NaOH solution was added slowly with stirring. The addition of the alkali was made over a period of one hour during which the reaction mass was maintained at a temperature of 0 to 5° C. The ester was washed with water until neutral and dried over calcium chloride. This ester is a clear high boiling liquid which became polymerized when heated with 5 percent benzoyl peroxide to form a hard transparent and nearly colorless solid. The monomer was believed to have the structure:

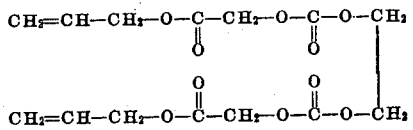

The sixth type of unsaturated esters of unsaturated alcohol and polyacidic esters may be prepared wherein the polyacidic ester is an ester of a simple polyhydroxy acid and at least two moles of a polybasic, preferably a dibasic acid.

For example, a polyhydroxy carboxylic acid such as tartaric, glyceric, resorcylic, saccharinic, mesoxalic and dihydroxy maleic acid, etc. may be reacted with two or more molecules of a partial ester of unsaturated alcohol and dibasic acid such as allyl acid phthalate, methallyl acid oxalate, chlorallyl acid malonate, crotyl acid oxalate, allyl acid succinate, vinyl acid oxalate, etc. The resulting acidic esters may then be esterified with unsaturated alcohol to produce neutral esters of the following structure:

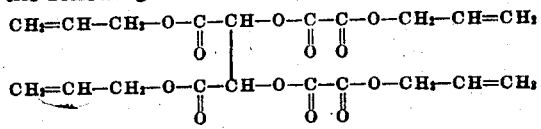

and

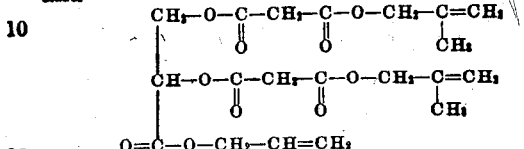

Alternatively, chloroformyl derivatives of unsaturated acids such as allyl phthalyl chloride, allyl oxalyl chloride, allyl succinyl chloride, allyl adipyl chloride or the corresponding methallyl, crotyl, oleyl, propargyl or other unsaturated derivative may be reacted with a saturated or an unsaturated ester of a polyhydroxy acid such as diallyl tartrate, allyl-methyl tartrate, diethyl tartrate, etc.

By treating the polyhydroxy carboxylic acid or an unsaturated ester thereof with a chloroformate of an unsaturated alcohol, the corresponding carbonate esters may be formed which may then be treated with the same or different unsaturated alcohol to produce neutral carbonate esters such as:

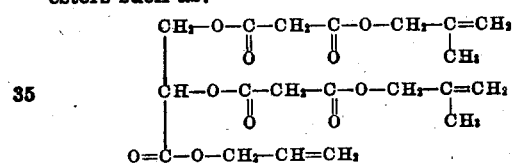

The following example is typical of the preparation of the esters of the sixth group.

Example XXIV

To a mixture of one mole of allyl glycerate 2.5 moles of pyridine and one-half liter of benzene was added two moles of allyl succinyl chloride while maintaining the temperature at 0 to 10° C. by stirring and cooling the mixture. The product was washed with dilute aqueous HCl solution, then with dilute sodium carbonate solution and finally with water to remove water soluble products. The mixture was then heated under a partial vacuum to drive off the benzene and the resulting ester was dried over sodium sulphate. The product has the following probable structure:

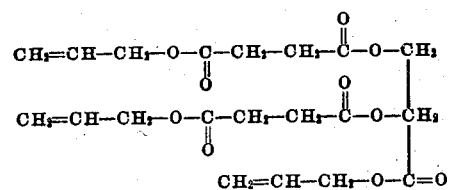

The ester polymerized upon heating at 150° C. in the presence of five percent acetone peroxide.

Example XXV

Allyl acid phthalate (100 g.) was treated with 120 gms. of thionyl chloride (100 percent excess) in 500 cc. of benzene. After refluxing four hours the excess thionyl chloride was distilled off. Sixty grams of diallyl tartrate were added to the benzene solution and 35 grams of 50 percent NaOH were slowly added with stirring while the reaction mass was maintained at a temperature between +5 and +15° C. by cooling upon an ice bath. The benzene solution was washed with dilute hydrochloric acid until neutral and with sodium carbonate. The benzene and volatile impurities were evaporated by heating in a vacuum. The resulting solid ester was believed to have the structural formula:

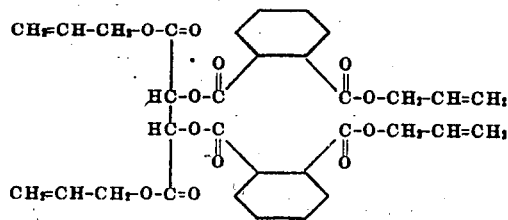

A five-gram portion of the ester was mixed with 4 percent benzoyl peroxide and pressed in a mold at 150° C. for one hour at a pressure of 1500 lbs. per sq. in. A hard product nearly colorless and transparent was formed.

A seventh type of unsaturated ester may be prepared by reacting an hydroxy acid containing at least two acidic groups such as tartaric, malic, tartronic, oxalacetic, citric, dihydroxymaleic or saccharic acids with a partial ester of an unsaturated alcohol and a dibasic acid such as allyl acid oxalate, methallyl acid malonate, allyl acid phthalate, vinyl acid succinate, methallyl acid dilactate, chlorallyl acid glutarate, crotyl acid oxalate, methallyl acid diglycolate, or vinyl acid adipate.

The resulting acid esters such as:

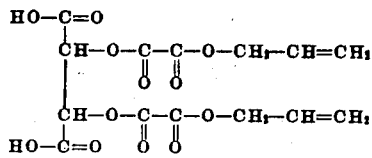

and

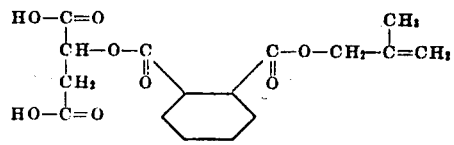

may then be reacted with a partial ester of (a) a glycol and (b) a partial ester of unsaturated alcohol and a dibasic acid such as etylene glycol mono ester of methallyl acid oxalate, diethylene glycol mono ester of allyl acid phthalate, trimethylene glycol mono ester of methallyl acid malonate, etc. to produce unsaturated neutral esters such as:

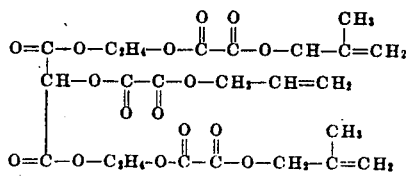

and

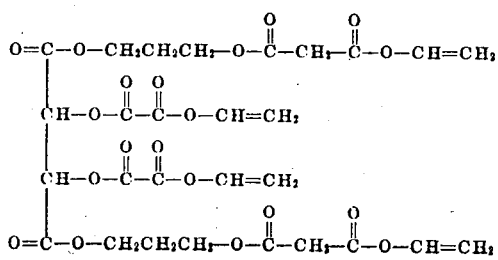

By a further method of preparation these esters may be prepared by treating the polybasic hydroxy acid to form an ester of a polyhydroxy compound wherein only one or part of the hydroxy groups is reacted. For example, tartaric acid may be reacted with ethylene oxide to form the bis(hydroxyethyl)ester. This ester may then be reacted with any of the above-mentioned acid esters of polybasic acids and unsaturated alcohols or the ester may be reacted with the corresponding acid chlorides mentioned above such as, for example, allyl phthalyl chloride, allyl succinyl chloride, etc., or with unsaturated haloformates such as allyl chloroformate.

By use of chloroformate substituted hydroxy compounds in place of acid esters, the carbonate esters corresponding to the above esters may be prepared, such as:

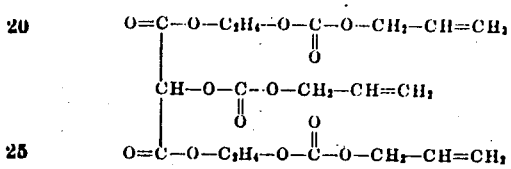

The following example is typical of the method of production of esters of the seventh group.

*Example XXVI*

75 grams of tartaric acid were treated with ethylene oxide at a temperature maintained between 40 and 60° C. by artificial cooling. When an equimolar quantity of ethylene oxide had been absorbed, a second portion of ethylene oxide was added while the temperature was maintained below 80° C. The resulting liquid consisted chiefly of bis (2-oxyethyl) tartrate. Four moles of methallyl chloroformate were then added and about six moles of NaOH added over a period of 1½ hours while maintaining the temperature between 0 and 20° C. by means of an ice bath. The complex ester formed was purified by washing with water and was treated to remove volatile impurities by heating in a vacuum. The composition was believed to be:

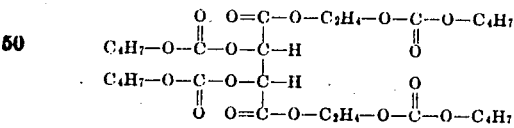

An eighth group of unsaturated esters are made by reacting a simple polyhydroxy acid such as tartaric, glyceric, resorcylic, saccharinic, mesoxalic, or dihydroxy malic acids with a partial ester of unsaturated alcohol and a dibasic acid such as allyl acid oxalate, methallyl acid phthalate, crotyl acid diglycolate, vinyl acid malonate, chlorallyl acid adipate, methyl vinyl carbinyl acid oxalate, or allyl acid dilactate to produce substituted acids, such as:

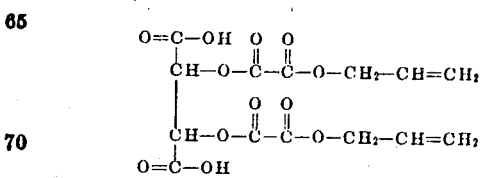

which are then treated with esters of unsaturated alcohol and simple hydroxy acids such as vinyl salicylate, allyl glycolate, methallyl lactate, crotyl lactate, allyl leucinate, or methallyl phloritate to produce neutral esters such as:

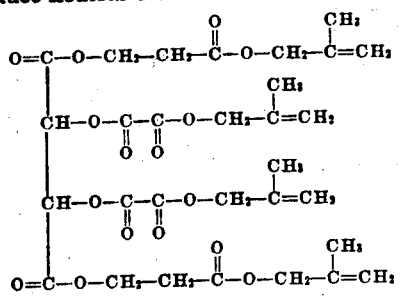

By using chloroformates of unsaturated alcohols in place of acid esters the carbonate ester corresponding to the above esters may be produced, such as the following:

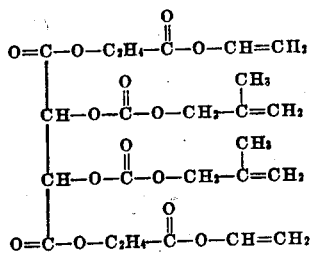

The following example is typical of the preparation of the esters of the eighth group.

*Example XXVII*

One mole (106 gms.) of glyceric acid was esterified with one mole of allyl lactate by heating the mixture at 90–100° C. under a reflux condenser for two hours in the presence of 5 g. of phenolsulphonic acid as a catalyst for the esterification. When the reaction was completed, two moles of allyl chloroformate and two moles of pyridine were slowly added over a period of one hour. The resulting ester was washed with water until neutral and volatile impurities were separated by vaporization of the impurities in a vacuum. The ester had the following structure:

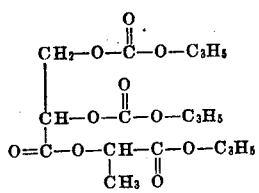

In accordance with a broader aspect of this invention, other unsaturated esters may be prepared which have similar properties and uses. Thus, a compound containing eight ester linkages may be prepared by reacting an unsaturated ester of lactyl lactic acid with glycol bis chloroformate or similar compound. The more irregular and larger molecular arrangements are sometimes more difficult to synthesize and are therefore less important commercially. Ordinarily, the simple straight chain type built of difunctional units such as dibasic acids, monohydroxy mono acids and dihydroxy compounds and the molecules built up with symmetrical ends are of greater utility and value because of the minimum of steps involved in the synthesis and the ease of controlling the reaction to prevent side reaction, and the accompanying loss of yield.

The unsaturated esters described herein are generally high boiling boil liquids some of which are capable of being distilled at reduced pressures. Other esters are solid at normal temperatures. Most of the liquid esters are clear, colorless and miscible with numerous organic solvents such as acetone, alcohol, chloroform, dioxane, benzene, xylene, toluene, ethyl ether paraffin hydrocarbons, etc. The monomeric esters are valuable as plasticizers for various resin materials such as styrene, cellulose, vinyl, urea, protein, phenolic, or acrylic resins. Other uses such as solvents, insecticides and liquid coating composition are noteworthy.

The most important uses of the new compounds involves their polymerizability in the presence of heat or light or other catalyst to yield solid or liquid compositions of widely different physical properties. The polymerization is preferably conducted in the presence of catalysts such as oxygen, ozone, or organic peroxides such as lauroyl, benzoyl, and acetone peroxides.

The products of polymerization vary greatly in their physical properties depending upon the molecular structure of the monomer as well as upon the extent of polymerization. In general, the polymers are transparent and colorless and upon complete polymerization, a resin which is substantially insoluble and infusible at atmospheric pressure is produced. A range of resins from hard, brittle products to soft flexible materials are secured. In the ultimate state the polymers are substantially unaffected by acids, alkalies, water and organic solvents. Intermediate polymers having a wide range of properties may be secured. Upon the initial polymerization of liquid monomers or solutions of the monomers in suitable solvents, an increase in the viscosity of the liquids is noticeable due to the formation of a simple polymer which is soluble in the monomer and in solvents such as acetone, benzene, xylene, dioxane, toluene or carbon tetrachloride. Upon further polymerization, the liquid sets up to form a soft gel containing substantial portions of polymers which are insoluble in the monomer and organic solvents, and containing as well, a substantial portion of soluble material which may be monomer and/or soluble fusible polymer. These gels are soft and bend readily. However, they are fragile and crumble or tear under low stresses. They may be further polymerized in the presence of catalysts to the final infusible insoluble state in which substantially all of the polymer is substantially infusible and substantially insoluble in organic solvents, acids and alkalies.

The monomers may be cast polymerized directly to the insoluble, infusible state. This procedure is subject to certain inherent difficulties due to the reduction in volume during the polymerization. The loss of volume or shrinkage causes strains to be established in the hardening gel which frequently result in fractures as the final hard form is attained. It has been discovered that these difficulties may be avoided by releasing the strains established in the gel. This may be done by interrupting the polymerization at an intermediate stage and permitting the strains to be relieved or by conducting polymerization under conditions which permit gradual release of these strains. For example, the polymerization may be conducted in a simple mold until a soft firm gel has formed. At this point the polymerization may be interrupted and the shaped polymer freed from the mold to which it adheres strongly. When released the polymer contracts substantially thereby relieving the polymerization strains. The gel may thereafter be shaped, if desired, and polymerized to the final infusible state. Smooth, optically perfect sheets may be made by this method. Preferably, the initial polymerization is conducted at a temperature sufficiently low to prevent the decomposition of the peroxide catalyst. This temperature is dependent upon the catalyst used. For benzoyl peroxide temperatures of 65 to 80° C. are suitable while for acetone peroxide temperatures of 140-150° C. may be used. The soft sheet of gel is then freed of the mold and in accordance with one modification the gel may be coated on both sides with monomer or the syrupy polymer. The coated article is then polymerized between smooth heated plates to the final insoluble state.

In order to inhibit formation of cracks during the initial polymerization, it is frequently desirable to minimize the polymerization on one side of the sheet. This is done by conducting the polymerization with one side exposed to the air which inhibits polymerization in the presence of a peroxide catalyst. Thus, a sheet is produced which is hard and smooth on one side while being soft and tacky on the other. The sheet may then be finished by coating the tacky side with monomer or syrupy polymer and polymerizing it in contact with a smooth plate to the insoluble, infusible state. Often it is found desirable to release the polymer from the plate one or more times during polymerization of the coating in order to minimize formation of cracks or other surface defects. Further details of this process may be found in an application for Letters Patent Serial No. 392,111, filed May 6, 1941, by Vincent Meunier and an application Serial No. 398,241, filed June 16, 1941, by Irving E. Muskat.

Other methods have been developed for polymerization of the compounds herein contemplated while avoiding formation of cracks and fractures. By one of these methods the polymerization may be suspended while the monomer polymer mixture is in the liquid state and before the polymer is converted to a gel by cooling, removal from exposure to ultraviolet light, by adding inhibiting materials such as pyrogallol, hydroquinone, aniline, phenylene diamine or sulphur or by destruction of the polymerization catalyst. The fusible polymer may be separated from all or part of the monomer by any of several methods. It may be precipitated by the addition of nonsolvents for the fusible polymer such as water, ethyl alcohol, methyl alcohol or glycol. Alternatively, it may also be separated from the monomer by distillation in the presence of an inhibitor for polymerization, and preferably at reduced pressures. The fusible polymer is thus obtained in stable solid form and as such may be used as a molding powder or may be redissolved in suitable solvent for use in liquid form. It is soluble in organic solvents which are normally capable of dissolving methyl methacrylate polymer or similar vinyl type polymer. Preferably, the polymers are produced by heating the monomer or a solution thereof in the presence of 2-5 percent of benzoyl peroxide until the viscosity of the solution has increased about 100 to 500 percent. This may be required from one-half to two hours while heating at 65-85° C. in the presence of benzoyl peroxide. The resulting viscous solution is poured into an equal volume of water, methyl or ethyl alcohol, glycol or other non-solvent for the fusible polymer. A polymer usually in the form of a powder or a gummy precipitate is thus formed which may be filtered and dried. This permits substantially complete separation of a soluble fusible polymer from unpolymerized monomer.

Often, however, such complete separation may not be desirable since hazy products may be secured upon further polymerization. Accordingly, it is often desirable to produce compositions comprising the fusible polymer and the monomer. This may be effected by partial distillation or extraction of monomer from the polymer or by reblending a portion of the fusible polymer with the same or a different polymerizable monomer. In general, the composition should contain at least 40 per cent and preferably in excess of 50 percent fusible polymer and from about 5 percent to 50 or 60 percent monomer.

Preferably, the production of these materials is conducted by treatment of a solution of the monomer in a solvent for monomer and polymer such as benzene, xylene, toluene, carbon tetrachloride, acetone or other solvent which normally dissolves vinyl polymers.

Other polymerization methods may involve the interruption of the polymerization while the polymer is a gel. For example, a soft solid gel containing a substantial proportion of fusible polymer may be digested with a quantity of solvent for the fusible polymer to extract the fusible gel from the infusible. The solution may then be treated as above described to separate the fusible polymer from the solvent. These polymers may be used as molding or coating compositions. Due to their solubility they are particularly desirable for use in paint compositions.

Other fusible polymers may be prepared by carrying the initial polymerization to the point where the polymer is in the form of a gel which generally contains at least 20 percent and preferably about 45 to 80 percent by weight of substantially insoluble polymer, but at which point the gel is still fusible. This solid resin composition may be disintegrated to a pulverulent form and used as a molding powder. Alternatively, a desirable polymer may be prepared by emulsifying the monomer or a syrupy polymer in an aqueous medium with or without a suitable emulsification agent such as polyvinyl alcohol, polyallyl alcohol, polymethallyl alcohol, etc. and then polymerizing to the point where the gel precipitates. This polymer may be separated and used as molding powder.

The solid forms of the fusible polymers may be used as molding compositions to form desirable molded products which may be polymerized to a thermohardened state. Preferably, the molding is conducted in a manner such that the polymer fuses or blends together to form a substantially homogeneous product before the composition is polymerized to a substantially infusible state. This may be effected by conducting polymerization at an elevated temperature and/or pressure in the presence of 1-5 percent of benzoyl peroxide generally in a heated mold. The polymers may be mixed with fillers such as alpha cellulose, wood pulp and other fibrous substances, mineral fillers or pigments such as zinc oxide or calcium carbonate, lead chromate, magnesium carbonate, calcium silicate, etc., plasticizers such as the saturated alcohol esters of phthalic acid, camphor, the saturated alcohol esters of maleic, fumaric, succinic and adipic acids or di- or triethylene glycol bis (butyl carbonate). The polymeric molding powder may be copolymerized with phenolic, cellulose acetate, urea, vinylic, protein or acrylic resins. It is thus possible to produce transparent or opaque forms of a wide variety of colors and hardnesses, depending upon the proper selection of the modifying agents.

The fusible polymers may be dissolved in suitable solvents and used as coating and impregnating compositions. For example, the solution or dispersion of fusible polymer in momomer or other organic solvent such as benzene, toluene, chloroform, acetone, dioxane, carbon tetrachloride, phenyl cellosolve, dichlorethyl ether, dibutyl phtalate or mixtures thereof is useful as a liquid coating composition. Objects of paper, metal, wood, cloth, leather or synthetic resins may be coated with the solution of polymer in solvent and subsequently polymerized to yield attractively finished coatings. Similarly porous objects of felt, cloth, leather, paper, etc. either in single layers or laminated may be impregnated with the dissolved fusible polymer and subjected to the polymerization to the final insoluble infusible state.

Although the present invention has been described with reference to certain specific embodiments, it is not intended that the details of such embodiments shall be regarded as limitations upon the scope of the invention except to the extent included in the following claim.

The application is a continuation-in-part of application Serial No. 361,280, filed October 15, 1940, by Irving E. Muskat and Franklin Strain.

We claim:

The compound

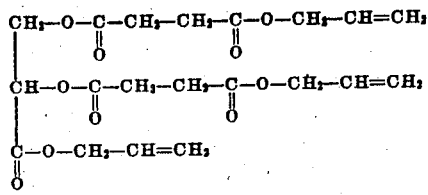

IRVING E. MUSKAT.
FRANKLIN STRAIN.